United States Patent [19]

Nott et al.

[11] 4,087,004

[45] May 2, 1978

[54] MAGNETIC BENEFICIATION OF CLAYS UTILIZING MAGNETIC PARTICULATES

[75] Inventors: Alan J. Nott, Crantock near Newquay, England; William M. Price, Tennille, Ga.

[73] Assignee: Anglo-American Clays Corporation, Sandersville, Ga.

[21] Appl. No.: 618,347

[22] Filed: Oct. 1, 1975

[51] Int. Cl.$^2$ .............................................. B03B 1/00
[52] U.S. Cl. ........................................ 209/9; 209/39; 209/214
[58] Field of Search ............... 209/214, 5, 8.1, 39; 210/40, 222, 42; 149/87; 252/62.56, 60; 428/402

[56] References Cited

U.S. PATENT DOCUMENTS

| 933,717 | 9/1909 | Lockwood | 209/8.1 |
|---|---|---|---|
| 1,043,851 | 11/1912 | Lockwood | 209/8.1 |
| 2,352,324 | 7/1944 | Mubler | 209/39 X |
| 2,834,470 | 5/1958 | Jones | 210/222 |
| 2,954,122 | 9/1960 | Colburn | 209/214 X |
| 3,215,572 | 11/1965 | Pupell | 149/87 X |
| 3,372,803 | 3/1968 | DeLisle | 209/214 X |
| 3,471,011 | 10/1969 | Ionicelli | 209/214 |
| 3,480,555 | 11/1969 | Jackson | 252/62.56 |
| 3,482,685 | 12/1969 | Molden | 209/5 |
| 3,627,678 | 12/1971 | Marston | 210/222 X |
| 3,676,337 | 3/1972 | Kolm | 210/42 |
| 3,806,449 | 4/1974 | Kaiser | 210/40 |
| 3,843,540 | 10/1974 | Reimers | 252/62.56 X |
| 3,853,983 | 12/1974 | Abercrombie | 209/214 X |
| 3,887,479 | 6/1975 | McClain | 252/62.56 X |
| 3,926,789 | 12/1975 | Shubert | 209/214 X |

FOREIGN PATENT DOCUMENTS

| 452,500 | 4/1975 | U.S.S.R. | 209/214 |
|---|---|---|---|

OTHER PUBLICATIONS

International Sci & Tech., Jul. 1974, pp. 48–56, and 90.

*Primary Examiner*—Robert Halper
*Attorney, Agent, or Firm*—Stefan J. Klauber

[57] ABSTRACT

A method for magnetically separating discoloring contaminants of low magnetic attractability from a crude kaolin clay containing said contaminants. A dispersed aqueous slurry of the clay is seeded with a finely divided magnetic particulate. The seeded slurry is then subjected to a magnetic field, to magnetically flocculate the contaminants and the magnetic particulate, and thereupon remove same.

24 Claims, No Drawings

MAGNETIC BENEFICIATION OF CLAYS UTILIZING MAGNETIC PARTICULATES

BACKGROUND OF INVENTION

This invention relates generally to methods for beneficiation of minerals, and more specifically relates to a method for improving the brightness of minerals such as kaolin clays, through the use of magnetic separation.

Naturally occurring minerals such as natural clays, carbonates, talcs or so forth, frequently include discoloring contaminants in the form of iron and/or iron-stained titanium-based impurities. The present invention has particular applicability to natural clays, including kaolin clays, and it may be noted in this connection that the quantities of the aforementioned titanium-based discolorants are particularly significant in the case of the sedimentary kaolins of Georgia, where such impurities are commonly present as iron-stained anatase and rutile.

In the case of the kaolin clays and others of the minerals mentioned, it is often desired and sometimes imperative to refine the natural product and bring the brightness characteristics thereof to a level acceptable for paper coating and other applications. Various techniques have been used in the past to effect the removal of the aforementioned discoloring impurities. Thus, for example, hydrosulfites have been widely used for converting at least part of the iron-based (or "ferruginous") impurities to soluble form, which may then be removed from the clays.

Among the most effective methods for removing titaniferous impurities, including e.g. iron-stained anatase, are the well-known froth flotation techniques. According to such methods an aqueous suspension or slurry of the clay is formed, the pH of the slurry is raised to an alkaline value, for example, by the addition of ammonium hydroxide, and a collecting agent is added, as for example, oleic acid. The slurry is then conditioned by agitating same for a relatively sustained period. A frothing agent, such as pine oil is then added to the conditioned slurry, after which air is passed through the slurry in a froth flotation cell to effect separation of the impurities.

Within recent years it has, further been demonstrated, that high intensity magnetic separation techniques may be utilized for removing certain of the aforementioned impurities, including titaniferrous impurities, and certain ferruginous matter. Anatase, for example, and certain other paramagnetic minerals, have been found to respond to high intensity magnetic fields. Thus in U.S. Pat. No. 3,676,337 to Henry H. Kolm for example, a process is disclosed for treating mineral slurries or the like, by passing same through a steel wool matrix in the presence of a background filed of at least 12,000 Gauss. Various apparatus, such as that disclosed in Marston, U.S. Pat. No. 3,627,678, may be utilized in carrying out the cited processes. In this latter instance the slurry to be treated is thus passed through a canister, which contains a stainless steel or similar filamentry ferromagnetic matrix, while a high intensity magnetic field is impressed on the matrix by enveloping coils.

While the use of high intensity magnetic separation as outlined in the foregoing paragraph, has found a high degree of acceptance in certain mineral beneficiation technology — most notably in the brightening of kaolins — it has generally been believed up until the present time, that such technology was not in fact capable of producing brightness improvements attainable by the use of the aforementioned flotation techniques. Neither, of course, has it been contemplated that field intensity levels of the low to intermediate type could be of value in brightening kaolins or the like, to commercially acceptable levels.

In accordance with the foregoing, it may be regarded as an object of the present invention, to provide a method for magnetic separation of discoloring contaminants from mineral slurries, such as kaolin slurries, which method enables brightness improvements previously unattainable through magnetic separation processes.

It is a further object of the present invention, to provide a method for magnetically beneficiating mineral slurries such as kaolins, which method yields brightness improvements at sufficiently high levels to obviate any requirement for flotation treatments.

It is a yet further object of the present invention, to provide a method for magnetic separation of discoloring contaminants from mineral slurries, which is based upon the use of particulate magnetic activating agents, of a type which are producible at low costs, and which have little or no detrimental impact upon the environment.

It is a still further object of the invention, to provide a method for magnetic separation of discoloring contaminants from kaolin slurries or the like, which enables the use of lower field intensities than have heretofore been deemed appropriate or feasible for such purposes.

It is a yet further object of the invention, to provide a method for magnetic separation of discoloring contaminants from kaolin slurries or the like, which may be utilized with existing magnetic separation apparatus, and which vastly increases the performance capabilities of such devices.

SUMMARY OF INVENTION

Now in accordance with the present invention, the foregoing objects and others as will become apparent in the course of the ensuing specification, are achieved in a method wherein a dispersed aqueous slurry of the crude mineral is admixed with a magnetic seeding particulate, which particulate is thus dispersed throughout the slurry so as to effectively seed the slurry. Thereupon, the seeded slurry is subjected to a magnetic field as, for example, by passing same through apparatus of the type cited in the aforementioned Marston patent. The said field acts to magnetically flocculate the contaminants and the seeding particles, and to thereupon remove at least part of the particulate together with the contaminants.

Following treatment by the magnetic field, the said slurry, e.g. after emerging from the magnetic separator, is flocculated, and then subjected to a conventional leaching step, typically with sodium hydrosulfite. The leached slurry may thereafter be washed free of residual leaching reagents and if desired, dewatered.

As will become further apparent in connection with the ensuing Examples, the leaching step in the present invention is of particular significance, in that the magnetic particulates are in many instances of very dark coloration. In consequence, the product emerging from the magnetic separator, despite the removal of vast quantities of the original discolorants, may yet display relatively unacceptable brightness. However, the discoloration arising from the remnants of the magnetic seeding particulate is due to iron compounds which are readily removed by leaching, whereas the displaced contaminants are of a type which are relatively unresponsive to conventional leaching.

It will, of course, be understood that where apparatus of the aforementioned Marston or similar types are utilized, the collection matrix over a period of time will become saturated with the elements removed from the slurry, i.e. with the magnetic particulates and the clay contaminants removed therewith. As is well-known in the present art, the matrices are therefore from time to time subjected to conventional flushing operations with the field removed or extinguished.

A preferable magnetic particulate for use with the processes of the invention, may comprise a particulate of ferroso-ferric oxide particles, wherein at least 50% by weight of the particles are of sub-micron size, which particulate is prepared as the product of co-precipitation of iron (III) with iron (II) salts by an excess of a relatively strong base. Preparation of a particulate of this type has been described as one aspect of a communication of W. C. Elmore, entitled "Ferromagnetic Colloid for Studying Magnetic Structures" in *Physical Review* 54, 309(1938). Although not as effective in the present application, a natural ferroso-ferric oxide, such as finely ground magnetite having a size distribution such that at least 50% by weight are less than 30 microns E. S. D., may also be used in practice of the invention. Similarly, other finely divided ferrimagnetic materials may be used as activators including cubic ferrites such as $NiFe_2O_4$ and $CoFe_2O_4$; and gamma ferric oxide.

Many of the so-called "ferrofluids" are also suitable for use in the invention. By the quoted term we refer to the class of colloidal suspensions described in numerous places in the scientific literature, such as in Kaiser, U.S. Pat. No. 3,806,449; in Reimers and Khalafala, U.S. Pat. No. 3,843,540, and in the widely-cited article by R. E. Rosensweig, entitled "Magnetic Fluids" appearing at page 48 of *International Science and Technology* for July, 1966. These ferrofluids may be based upon colloidal suspensions of the magnetic materials cited above or upon suspensions of other ferrimagnetic or ferromagnetic particles.

A principal consequence of the present invention, is that the performance levels of magnetic separation apparatus are so vastly augmented that one may elect to trade-off flow rates through a given apparatus (and thereby retention time in the field) against field intensity, to an extent heretofore not deemed practical. The magnetic field to which the slurry is subjected, may thus, in the practice of the invention, be dropped to at least as low as 5 kilogauss — and yet provide brightening of the treated mineral to fully acceptable levels, i.e. to levels previously attainable only at intensities in the so-called "high intensity" range of from about 12 to 15 kilogauss or higher. At the cited 5 kilogauss level a retention time of the order of 70 to 80 seconds (or more) will be effective in yielding the result mentioned. More generally retention times are adjusted to the field intensities utilized and the brightening required: For example, the aforementioned Marston-Type of apparatus is designed for (and has in the past been operated) at about 15 to 22 kilogauss. With these levels of field intensities typical retention time in the practice of the present invention are of the order of 15 to 80 seconds. Within the limits of the technology (and of economics), higher fields may also be used with the invention, e.g. up to 60 kilogauss, or higher.

DESCRIPTION OF PREFERRED EMBODIMENT

The manner in which the present invention is practiced, is best understood by consideration of the Examples now to be set forth, which further, will render clear to those familiar with the present art, the striking brightness improvements achieved by the practice of the present methodology.

EXAMPLE I

In order initially to establish control data for demonstrating the efficacy of the present invention, four groups of soft, cream Georgia kaolin clay samples, were beneficiated: (1) by leaching alone; (2) by use of flotation alone; (3) by prior art magnetic separation; and (4) by a prior art combined flotation and magnetic separation treatment. Two of the said clay groups (Clays A and B) were of a "coarse" variety; the other two (Clays C and D) were "fine" clays. In each instance the crude sample was initially blunged. Specifically, an aqueous, alkaline dispersion of the crude clay was formed (pH adjusted to about 7 to 10 with ammonium hydroxide), the blunging being effected in the presence of a small amount of a dispersant such as sodium silicate, and the amount of energy dissipated being approximately 10 HP-hr/ton of solids. The blunged sample was then subjected to further treatment — in accordance with the test schedule. Effectiveness of the various beneficiation treatment were gauged by determining the resultant brightness for the 90% less than 2 micron fraction of the treated sample. The resultant data is set forth in Table I below, where in each instance the numerical brightness values are the so-called "G.E. Brightness" obtained according to the standard specification established by TAPPI procedure T-646m-54.

Table I

| Clay | Process | $TiO_2$ % | $Fe_2O_3$ % | Brightness Product | Brightness Leaching (8#) |
|---|---|---|---|---|---|
|  | Blunged | 1.77 | — | 84.5 | 86.8 |
| Clay A | Float | 0.50 | — | 89.5 | 91.6 |
|  | Magnet | 1.29 | — | 87.9 | 90.0 |
|  | Float + Magnet | 0.46 | — | 90.6 | 92.0 |
|  | Blunged | 1.63 | 0.24 | 77.9 | 84.1 |
| Clay B | Float | 0.42 | 0.24 | 88.0 | 91.2 |
|  | Magnet | 0.99 | 0.18 | 84.3 | 87.9 |
|  | Float + Magnet | 0.42 | 0.18 | 89.8 | 91.7 |
|  | Blunged | 1.45 | — | 82.3 | 87.2 |
| Clay C | Float | 0.17 | — | 87.8 | 90.5 |
|  | Magnet | 0.77 | — | 87.3 | 90.2 |
|  | Float + Magnet | 0.03 | — | 90.1 | 91.9 |
|  | Blunged | 1.47 | 1.10 | 83.1 | 88.0 |
| Clay D | Float | 0.39 | 1.18 | 86.3 | 90.8 |
|  | Magnet | 1.02 | 0.90 | 87.5 | 89.6 |
|  | Float + Magnet | 0.35 | 0.91 | 90.0 | 91.7 |

In each instance in Table I, brightness data is set forth for the treated sample both before ("product"), and after leaching with sodium hydrosulfite at addition levels of 8 lbs/ton of solids. Both the $TiO_2$ and $Fe_2O_3$ contents — as is customary in this art — were determined prior to leaching.

The flotation data in Table I was generated by subjecting the samples to conventional flotation treatment. This was effected by blunging and conditioning such samples with oleic acid as a collector agent, in quantities in the range of from about 2 to 4 lbs/ton. The solids content during such blunging and conditioning was 60%. The amount of energy dissipated during blunging and conditioning was from about 40 to 50 HP-hr/ton solids. The blunged and conditioned slurry, after addition of a frothing agent as, for example, pine oil, was then subjected to a conventional treatment in a froth flotation cell, i.e. air was passed through the slurry in said cell to effect separation of impurities from the clay.

The data of Table I identified as "magnet" was yielded by subjecting the samples to a prior art-type of magnetic separation. In particular slurry samples that had previously been blunged, were passed at about 30% solids, through a steel-wool matrix (7.5% packing) in an apparatus of the general type depicted in the aforementioned Marston U.S. Pat. No. 3,627,678 patent. The average field intensity during such treatment was about 15 kilogauss, and the retention time in the field was approximately 1.2 minutes. These conditions approximate to a 10 ton/hr. production rate for an 84 inch magnet (I.D.) at 30% solids — and are deemed relatively optimal.

The data of Table I identified as "float + magnet" was yielded by subjecting the samples to sequential flotation and magnetic separation — each said step being effected under the same conditions as just outlined. It may be noted in this connection that such a sequential process has been disclosed in the present co-inventor Alan J. Nott's patent application Ser. No. 513,154 filed Oct. 8, 1974, wherein it is taught that the initial flotation treatment enables removal by high intensity magnetic separation of impurities not otherwise amenable to the magnetic separation. The brightness increase and $TiO_2$ reduction brought about by this conjunctive treatment, are in fact the most superior results yielded in the tabulated data of Table I.

A preferred magnetic seeding particulate for use in the processes of the present invention is a synthesized ferroso-ferric oxide which is prepared by coprecipitating iron (III) and iron (II) ions from an aqueous solution in a desired molar ratio, by neutralization with an excess of a relatively strong base, such as ammonium or sodium hydroxide. The size and size distributions of the resultant particulate varies somewhat according to the specifics of the reaction conditions; but in general the particulate has a size distribution such that at least 50% by weight of the particles have an equivalent diameter less than 1 micron — as determined by Sedigraph analysis. ("Sedigraph" is a trademark for size analysis instruments manufactured by Micromeritics Instrument Corp., of Norcross, Ga.)

The cited reaction results in an intense black colored ferrimagnetic precipitate. The molar proportions of the two iron species can be mixed to yield products of varying magnetic saturation values. In a preferred compositional range the ferroso-ferric oxide thus prepared, will have an iron (III) to iron (II) ratio from about 1 to 2.5; with a yet more optimal range having a ratio of from about 1.5 to 2.0.

EXAMPLE II

A magnetic seeding particulate for use in the processes of the invention, was prepared by weighing 12.8 g of $FeCl_2 \cdot 4H_2O$ and 18.6g of $FeCl_3$ (anhydrous) in a 400 ml flask. 200 ml of deionized water were added, with good stirring. With vigorous stirring 61.2 ml of $NH_4OH$ (28% solution) were thereupon slowly added. This yielded approximately 264 ml of magnetic seeding particulate "solution". Dose rates in many of the following Examples are expressed in ml of such an aqueous magnetic particulate added to a clay slurry containing 4 lb. dry weight of clay. For example, a dose rate of 100 ml/4 lb. clay corresponds to 50 liters/ton or 13.2 U.S. gallons/ton. If it is assumed that all the iron in the salt solution is converted to $Fe_3O_4$, then 264 ml of the aqueous magnetic particulate will contain 13.2 g $Fe_3O_4$. Therefore a dose rate of 100 ml/4lb. clay will correspond to 5.0g/4 lbs. clay, to 2.5 Kg $Fe_3O_4$ per ton of clay, or 4.5 lbs. $Fe_3O_4$ per ton of clay.

EXAMPLE III

The aqueous magnetic seeding particulate of Example II was added to and thoroughly mixed with aqueous slurries (30% solids) of kaolin clay samples of the type identified in Example I as "Clay A". The resultant "seeded" slurry was then passed through a magnetic separating apparatus of the type cited in Example I. The average field intensity at the steel wool matrix utilized was 15 kilogauss. Various pumping rates were employed (yielding varying retention times in the field); and varying dosage rates of the magnetic seeding material were employed. The resultant data is set forth in Table II below:

Table II

| Procedure | Dose Rate ml. | Pump Setting | $TiO_2$ (%) | $Fe_2O_3$ (%) | Brightness Product | Brightness Leached (8#/ton) |
|---|---|---|---|---|---|---|
| Flotation | 0 | — | 0.42 | 1.12 | 86.6 | 90.8 |
|  | 0 | 10 | — | — | 88.1 | 90.4 |
| Magnet | 0 | 20 | — | — | 88.2 | 90.1 |
|  | 0 | 30 | — | — | 87.2 | 89.8 |
|  | 0 | 10 | 0.29 | 0.93 | 90.1 | 92.0 |
| Float + | 0 | 20 | 0.42 | 0.78 | 89.7 | 92.0 |
| Magnet | 0 | 30 | 0.35 | 0.89 | 89.3 | 92.0 |
| Magnet + |  | 10 | 0.93 | 0.98 | 87.5 | 90.2 |
| Seeding | 25 ml | 20 | 1.05 | 0.91 | 86.6 | 90.0 |
| Par- |  | 30 | 1.12 | 0.93 | 86.1 | 89.8 |
| ticulate |  | 10 | 1.05 | 0.86 | 87.8 | 90.6 |
|  | 50 ml | 20 | 0.97 | 0.91 | 86.8 | 90.0 |
|  |  | 30 | 1.02 | 0.95 | 86.0 | 89.8 |
|  |  | 10 | 0.48 | 0.94 | 86.7 | 91.8 |
|  | 100 ml | 20 | 0.48 | 0.88 | 85.7 | 91.4 |
|  |  | 30 | 0.66 | 1.03 | 83.3 | 91.2 |
|  |  | 10 | 0.55 | 1.09 | 81.2 | 91.5 |
|  | 150 ml | 20 | 0.51 | 1.09 | 80.9 | 91.6 |
|  |  | 30 | 0.45 | 1.18 | 80.9 | 91.2 |

The brightness data appearing in Table II are all taken (as heretofore described) for the 90% less than 2 micron fraction of the treated sample. The pump settings, identified as "10", "20" and "30", corresond respectively to approximate field retention times as follows:

Table III

| Pump Setting | Retention Time (secs.) |
|---|---|
| 10 | 72 |
| 20 | 48 |
| 30 | 24 |

On comparing the data of Table II appearing to the right of the procedure identified as "Magnet + Seeding Particulate", to the control results appearing immediately thereabove (and also to the control data of Table I), it will be evident that the leached brightness levels achieved (especially when the relatively optimized doseage levels around 100 ml. are considered), much exceeds the brightness improvements yielded by prior art magnetic separation alone. The improvement in brightness at the more optimal levels of the seeding composition, also clearly exceeds the result obtained by prior art flotation; and the prior art flotation plus magnetic separation techniques provide only marginally better results than the application of the inventive method.

There is an average of about 0.4 brightness units difference between results obtained with pump settings 10 (72 sec. retention) and 30 (24 seconds retention). The low retention time data is particularly noteworthy — in that the 24 second retention time is well below that previously thought necessary to obtain even useful brightness improvement, much less improvements exceeding those yielded by flotation.

It may be noted in Table II that the "Magnet + Seeding Particulate" brightness are in general lower for the "Product" taken from the magnetic separator than the "Products" of the various other treatment processes — i.e. the "Product" is of lower brightness until leaching is effected. This result obtains because of the intense dark coloration of the magnetic particulate. Basically the individual particles added by the invention (as will be further discussed hereinbelow) serve in the presence of the magnetic field to collect impurities such as iron-stained $TiO_2$. While large quantities of such impurities are thus removed (together with the seeding particles) as the seeded slurry passes through the separator, the "Product" (as it emerges from the separator) may actually show an increase in $Fe_2O_3$ content and a darkening in color — in that the amount of iron added by the remnants of the seeding material, can equal or exceed the amount of "bound" iron removed with the $TiO_2$ and other impurities. However the seeding material is, of course, (unlike the $TiO_2$) readily removable by leaching. The hypothesis just stated is fully supported by the data of Table II, as well as by the data which will be set forth in connection with the further Examples hereinbelow. Thus e.g. it will be observed (by comparing Table I) that the $TiO_2$ content of the samples treated by the present invention, are about 40% lower than that of corresponding samples subjected to prior art magnetic separation.

The precise mechanism which enables the results yielded by the present invention, are at present only imperfectly understood. It is hypothesized, however, that the magnetically responsive members of the particulate introduced by the present process, serve to define points of high magnetic field gradient upon the seeded slurry reaching the magnetic field. The mechanism in this sense may be thought of as analogous to that which enables the aforementioned steel wool matrix itself to act as an effective collector of paramagnetic and other low attractability impurities. However, the particulate magnetic seeding material — when so regarded — is more accurately seen to be an extension of this prior art mechanism, since firstly the collection sites presented by the particulate are much smaller than the sites presented by the steel wool; and, secondly, because the individual particles are highly dispersed and mobile. Conceptually the masses of collection sites presented by the activators can perhaps be more accurately thought of as a mobile, or dynamic collection matrix.

It may also be noted in connection with the foregoing analysis, that it has from time to time been observed in the prior art that certain additives possessing ferromagnetic or ferrimagnetic properties can be useful in the course of performing magnetic separation. A noteworthy example may be found in Hubler, U.S. Pat. No. 2,352,324, a disclosure relating to the beneficiation of feldspathic ores. Hubler, as one aspect of this beneficiation process, may include a wet magnetic separation step. He notes in that connection that conditioning of the ore in the presence of certain fatty acid reagents such as oleic acid, benefits the magnetic separation process; and he indicates that the improvement comes about because the fatty acid reagent coats the particulate contaminants so as to enable magnetite which is present in the ore, to then become attached to and coat the impurities.

Teachings of the foregoing type however, are quite distinct from the present invention, wherein no fatty acid reagents or the like are used. The mechanisms of the present invention are indeed quite distinct from those that may have occurred in art such as Hubler. This is possibly due to the vast differential in particle size for the additives, as well as to the differences in the nature of the particulate compositions. The mechanism in the present invention is thus not believed to involve a coating of impurities with the magnetic particulate via intermediates such as fatty acid reagents. On the contrary, the action of the present invention may more properly be regarded as a "seeding" type of operation, wherein the individual very minute particles (upon being rendered regions of high field gradient by the externally applied magnetic field) serve as collection sites for the impurities. The efficiency of the present process, and particularly the fact that such process is able to remove very minute-sized contaminants is a direct consequence of this seeding-type action, and of the high field gradients that occur during the seeding and collection sequence. Thus the present mechanism is not one wherein relatively large particles are chemically attached to other relatively large particles, but rather one wherein magnetic particles and contaminants are physically flocculated by the magnetic field.

EXAMPLE IV

Preparation of magnetic particulates of the general type described in Example II is also reported in Reimers and Khalafalla U.S. Pat. No. 3,843,540, where, however, the ferrosoferric oxide precipitate is primarily deemed of interest as an intermediate product in the formation of the ferrofluids otherwise disclosed. The said investigators state that the precipitate may be produced using any relatively strong base, but that use of ammonium hydroxide is very much preferred. It appears that ammonium hydroxide is so preferred, because in the subsequent preparation of ferrofluids sodium oleate is formed, which although soluble in water, will not decompose at low to moderate temperature as does ammonium oleate. Hence magnetic particles having an absorbed oleic acid coating are formed, which do not prevent the formation of a ferrofluid. This reasoning does not, of course, apply to the process set forth e.g. in Example III herein, where the ferroso-ferric oxide is not rendered into a ferrofluid.

Nonetheless the present Example illustrates that generally superior results are achieved with the present invention where the ferroso-ferric oxide is prepared via use of ammonium hydroxide. In particular magnetic seeding particulates were prepared by dissolving 1.3g of $FeCl_2 \cdot 4H_2O$ and 3.0g of $FeCl_3 \cdot 6H_2O$ in distilled water, and adding 3.6g of sodium hydroxide dissolved in water or an equivalent of ammonium hydroxide (28% solution).

A ferrofluid was also prepared by mixing a precipitate prepared as above, with a solution of 2 ml of oleic acid in 25 ml of kerosene and heating for 10 minutes at 60°–70° C. The mixture was allowed to separate into two layers — the black colored organic layer being the ferrofluid.

Seeding materials prepared as above, were then thoroughly mixed with 40% solids clay slurries containing 4 lb. dry clay of the aforementioned "Clay-A" type, and the slurries were subjected to magnetic separation utilizing a steel wool matrix, a magnetic field intensity of 15 kilogauss and a pump setting of 10 (72 sec. retention time). The resultant brightness, $TiO_2$, and $Fe_2O_3$ contents are set forth in Table IV below, from which it will be evident that somewhat superior results are indeed yielded where the ammonium hydroxide is employed:

Table IV

| Seed | Base | $TiO_2$ (%) | $Fe_2O_3$ (%) | Brightness Product | Brightness Leached 8#/ton |
|---|---|---|---|---|---|
| Aqueous Ferroso-ferric oxide particulate | NaOH | 0.03 | 0.18 | 86.2 | 92.0 |
| | $NH_4OH$ | 0.03 | 0.25 | 90.6 | 92.5 |
| Ferrofluid | NaOH | 0.35 | 0.19 | 89.4 | 90.0 |
| | $NH_4OH$ | 0.24 | 0.19 | 88.9 | 91.2 |

As illustrated in Example IV, the magnetic seeding particulate utilized with the invention, may also comprise a ferrofluid. Such fluids, in general, comprise permanent suspensions of ferrimagnetic and/or ferromagnetic particles in a liquid carrier. By "permanent" is meant that the suspended materials, which are of colloidal size, do not separate from the liquid carrier in the presence of magnetic, gravitational, or other conventional force fluids. The carrier, in the instances of the most commonly employed ferrofluids comprises an organic liquid such as kerosene, methyl cyclohexane, pentane, n-heptane or so forth, but ferrofluids employing aqueous carriers are also utilizable in the invention, such as for example, the aqueous ferrofluid described in U.S. Pat. No. 3,480,555, which is a stable suspension of gamma ferric oxide in a water carrier.

A preferred ferrofluid for use with the present invention is described in the aforementioned Reimers and Khalafalla, U.S. Pat. No. 3,483,540. In the teaching of the cited patent, the ferrofluids are thus prepared by a process wherein one initially precipitates an aqueous suspension of sub-micron sized ferrosoferric oxide particles by the rapid neutralization of a mixed ferrous-ferric salt solution by addition of a relatively strong base, such as ammonium hydroxide. The resultant precipitated particles are coated in aqueous phase with a dispersing agent. Thereupon the dispersing agent-coated particles are extracted from the aqueous phase into an organic liquid, to form a peptized, stable colloidal suspension of magnetic particles in a liquid carrier medium.

Other ferrofluids utilizable with the invention may be based upon relatively stable suspensions of other sub-micron sized ferrimagnetic particulates, such as of very finely divided natural magnetite (e.g. produced by long-term grinding as disclosed in U.S. Pat. No. 3,215,572), of gamma-ferric oxide, and more generally of the magnetic ferrites represented by the general formula $MO \cdot Fe_2O_3$ where M is a divalent metal ion such as Mn, Ni, Fe, Co, Mg, etc.

It should also be appreciated that the line of demarcation between ferrofluids and the type of particulates described e.g. in Example II, is not a completely sharp one. The aforementioned Elmore paper indeed recommends peptization of the ferrosoferric oxide with HCl, before same is added to a ½% soap solution, the soap acting as a protective colloid. The product described by Elmore is quite effective in the present invention (see Example XIII), although it is not completely clear that the term "ferrofluid" is properly applicable thereto.

EXAMPLE V

In order to demonstrate the efficacy of ferrofluids in the present invention, an aqueous magnetic seeding particulate was prepared as in Example II (yielding 264 ml of the aqueous composition). A mixture of 230 ml kerosene and 20 ml of oleic acid was slowly added to this composition, with good agitation. This mixture was then brought to 60° C and held at this temperature with continuous stirring (to assure uniform temperature) for 10 minutes. The water was not removed. The resultant ferrofluid at various doseage levels (and with various retention times) was then used to treat kaolin clay samples of the "Clay C" type, which treated samples were then passed through magnetic separating apparatus under conditions as in Example III. The resultant data is set forth in Table V below:

Table V

| Dose Rate ml. | Pump Setting | $TiO_2$ (%) | $Fe_2O_3$ (%) | Brightness Product | Brightness Leached (8#) |
|---|---|---|---|---|---|
| 25 ml | 10 | 0.81 | 1.09 | 88.2 | 90.8 |
| | 20 | 0.81 | 1.01 | 87.6 | 90.5 |
| | 30 | 0.81 | 1.12 | 86.6 | 90.2 |
| 50 ml | 10 | 0.75 | 1.12 | 88.2 | 91.0 |
| | 20 | 0.78 | 0.99 | 87.0 | 90.4 |
| | 30 | 0.81 | 1.08 | 86.6 | 90.1 |
| 100 ml | 10 | 0.75 | 1.06 | 87.9 | 90.5 |
| | 20 | 0.87 | 1.03 | 86.9 | 89.9 |
| | 30 | 0.81 | 1.12 | 86.0 | 89.5 |
| 150 ml | 10 | 0.70 | 0.97 | 86.8 | 90.4 |
| | 20 | 0.75 | 1.03 | 86.7 | 89.9 |
| | 30 | 0.93 | 1.12 | 84.5 | 89.1 |

The doseage rates set forth in Table V are expressed in ml of the treating composition — prepared as just indicated. To a good approximation 200 ml of this ferrofluid and 100 ml of the simplified aqueous particulate of Example II, will contain the same weight of ferroso-ferric oxide. In comparing the results of Tables II and V this distinction in oxide content should be borne in mind.

The tabulated data of Table V indicates that best results (in terms of brightening) are achieved at the lower doseage rates, i.e. at about 25–50 ml. The likely reason for this is that the method for preparing the ferrofluuid results in peptizing of the individual magnetic particles, yielding very many more individual magnetic seeds in the seeded slurry. This aspect of the present invention will become further evident in connection with Example XIII, hereinbelow.

It will be evident upon comparing the data of Table V with the control data of Table I, (for the "Clay C" samples) that the best brightness obtainable with the ferrofluids here utilized, are superior to the results yielded by prior art flotation or prior art magentic separation individually — but are not so good as the brightness improvements obtained by the combined prior art flotation plus magnetic separation process.

It will also be evident by comparing Tables II and V that the best results obtained with the ferrofluid treatment were still inferior to the results provided by treatment with the particulate of Example II. It has previously been indicated that the aqueous, unpeptized particulate of Example II is preferable for use in the present invention to the true ferrofluids, e.g. to the ferrofluid of the present Example. A principal reason for this is, of course, the superior brightening achieved via the aqueous particulates — this aspect of the invention will become further evident in the ensuing Examples. The cost of these magnetic activating materials is also low, enabling economical processing. To improve the economics of the process even further, one may utilize lower quality starting materials for preparing the particulates of Example II; e.g. the sources of iron salts may comprise waste pickling liquors from steel mills, or similar industrial waste products.

In addition, use of the aqueous, unpeptized particulates, obviates the need for a carrier such as the organic liquids commonly employed in ferrofluids. This in turn, eliminates any requirement for removing, disposing or recycling the organic carrier, which (aside from simplifying the process) is a very important consideration from the viewpoint of environmental impact. In particular, the said organic carrier, when used can present a very substantial disposal and/or control problem.

EXAMPLE VI

The magnetic seeding particulates of the present invention appear, in general, to yield superior results when used in a freshly-prepared state. This is especially true for the simplified materials of Example II. The last result is believed to obtain because the said aqueous materials — in that they are not dispersed as are true colloids — are relatively subject to change in size distribution as a function of time, i.e. by agglomeration, etc.

In order to demonstrate the foregoing factors, an aqueous particulate composition was prepared in accordance with Example II. Half of this composition was in turn, used to prepare a ferrofluid, i.e. a "complex" composition as in Example V.

The simple (Example II) particulate was added to a kaolin clay slurry at a doseage rate of 100 ml per 4 pounds of dry clay; the complex particulate, i.e. the ferrofluid, was added at the rate of 200 ml per 4 pounds of dry clay. As indicated in connection with Example V, approximately equivalent amounts of $Fe_3O_4$ were thus added. The said particulates were specifically added to the clay slurrly after the following times: (i) immediately upon preparation; and after (ii) 4 hours; (iii) 8 hours; (iv) 20 l hours, and (v) 32 hours. The treated slurries were then passed through magnetic separating apparatus as in Example I at 20% solids, utilizing a pump setting of 10 (corresponding to retention time of 72 seconds), with the field intensity at the steel wool matrix being 15 kilogauss. $TiO_2$ and $Fe_2O_3$ were determined on dry samples after the separation, and before leaching. Brightnesses were measured for 0, 4, 6 and 8 lbs/ton leach level. The resultant data is set forth in Table VI hereinbelow:

Table VI

| Activator | Time hrs. | $TiO_2$ | $Fe_2O_3$ | Product Brightness | Leached Brightness 4#/ton | 6#/ton | 8#/ton |
|---|---|---|---|---|---|---|---|
| None | — | 1.09 | 1.05 | 87.3 | 90.1 | 90.2 | 90.2 |
| Aqueous Magnetic Particulate | 0 | 0.61 | 1.05 | 86.6 | 91.0 | 91.5 | 91.5 |
| | 4 | | | 87.2 | 89.9 | 90.5 | 90.6 |
| | 8 | 1.09 | 0.97 | 87.6 | 90.5 | 90.5 | 90.5 |
| | 20 | 0.90 | 0.93 | 87.5 | 90.5 | 90.5 | 90.5 |
| | 32 | 0.90 | 0.97 | 87.0 | 90.6 | 90.6 | 90.6 |
| Complex Magnetic Particulate (Ferrofluid) | 0 | 1.12 | 0.91 | 86.2 | 89.8 | 89.9 | 89.9 |
| | 4 | 0.90 | 0.99 | 85.0 | 89.5 | 89.4 | 89.4 |
| | 8 | 0.93 | 0.93 | 86.0 | 89.8 | 89.9 | 89.9 |
| | 20 | 0.87 | 0.91 | 86.4 | 89.8 | 89.7 | 89.7 |
| | 32 | 0.91 | 1.00 | 86.2 | 90.0 | 90.0 | 89.8 |

The data tabulated in Table VI establishes, in accordance with prior discussion had on the point, that the simplified particulates perform in generally superior fashion — compared to the complex particulates, i.e. the ferrofluids. Clearly, further, the freshly-prepared particulate, especially the simplified particulate, gave the best results. Product brightness, it will be noted, is in some cases lower than product brightness where no seeding particulate is employed. As previously discussed in connection with Example III, this result obtains because some of the intensely colored black $Fe_3O_4$ passes through the magnet — but the drop in brightness is recovered upon leaching, i.e. the excess $Fe_3O_4$ is then reduced by the hydrosulfite leaching reagent.

EXAMPLE VII

Sampes of the simplified magnetic seeding particulate of the type utilized in Example III, were subjected to particle size distribution analysis by means of a Sedigraph Particle Size Analyzer. It was found that when the freshly prepared ferrosoferric oxide was diluted with deionized water and analyzed, the resultant particle size distribution was bimodal, and suggested that only about 25% of the particles had an equivalent spherical diameter (E.S.D.) of less than 1 micron. When, however, a small amount (5 to 10 ml) of Dispex (the latter being a trade name of Allied Colloids, Great Britain for a water soluble salt of a polyacrylic or a polymethacrylic acid) was added to the composition, and the latter then homogenized in a Waring blender, the resultant P.S.D. (particle size distribution) curve indicated that approximately 50% by weight of the particles were below 1 micron E.S.D., with only a fraction of the particles being over 10 microns. Furthermore this second size distribution determination was completely reproducible. It has been assumed that size determination when thus made in the presence of the dispersing agent, reflects an accurate Sedigraph analysis of the particulate — since it is believed that without the dispersing agent, agglomeration of particles and other extraneous factors, prevent an accurate determination of size distribution.

The P.S.D. of the same particulate — which had, however, been aged for 16 hours — was then determined, again in the presence of small quantities of Dispex. It appeared from this second analysis that somewhat under 35% of the particles had an E.S.D. of less than 1 micron; with the maximum particle size cutting off at about 10 microns E.S.D. This indicated that after the time duration cited, a certain amount of coagulation had occurred.

A further series of tests were then evaluated, wherein the Dispex was added immediately after addition of ammonium hydroxide, followed by a step of homogenizing in a high speed mixer. In this instance the P.S.D. was such that 70% by weight of particles had an E.S.D. of less than 1 micron. Again, all determinations were made by Sedigraph analysis.

EXAMPLE VIII

In the present Example, samples of the "Clay D" kaolin clays were treated with widely varying doseage rates of the simplified magnetic seeding particulates of Example II. The treated samples were then subjected to magnetic separation by the same procedure, and using the type of apparatus, set forth in Example III. In each instance the field intensity utilized was 15 kilogauss, a pump setting of 10 (corresponding to 72 seconds retention time), and a steel wool matrix with 7.5% packing was employed. In each instance product brightness was determined for the samples from the magnetic separator ("product"), and leached brightnesses at various levels of leach addition were determined. Similarly the TiO$_2$ and Fe$_2$O$_3$ contents were determined for the treated samples. For purposes of comparison, several tests were also run, utilizing prior art flotation alone, prior art flotation plus magnetic separation, blunging alone, and prior art magnetic separation alone. In all instances the course of treatment for the prior art techniques, is as set forth in Example I herein. The results yielded are set forth in Table VII below:

Table VII

| Method | Aqueous Mag. Part. (ml/4# clay) | Product Brightness | Leached Brightness | | | TiO$_2$ % | Fe$_2$O$_3$ % |
|---|---|---|---|---|---|---|---|
| | | | 4#/ton | 6#/ton | 8#/ton | | |
| Float alone | — | 86.3 | 90.6 | 90.8 | 90.8 | 0.39 | 1.18 |
| Float + Magnet | — | 90.0 | 91.7 | 91.7 | 91.7 | 0.35 | 0.91 |
| Blunger alone | — | 83.1 | 88.0 | 88.0 | 88.0 | 1.47 | 1.10 |
| Magnet alone | — | 87.5 | 89.5 | 89.6 | 89.6 | 1.02 | 0.90 |
| Magnet + Magnetic Particulate | 25 | 87.0 | 89.5 | 89.5 | 89.5 | 0.90 | 0.93 |
| Particulate | 50 | 87.3 | 89.8 | 89.8 | 89.8 | 0.87 | 1.01 |
| Particulate | 75 | 87.5 | 89.9 | 90.0 | 90.0 | 0.81 | 0.89 |
| Particulate | 100 | 86.8 | 89.5 | 89.5 | 89.5 | 0.99 | 1.01 |
| Particulate | 100* | 89.0 | 90.5 | 90.6 | 90.8 | 0.70 | 0.94 |
| Particulate | 125 | 85.0 | 87.3 | 90.2 | 90.3 | 0.78 | 1.01 |
| Particulate | 150 | 85.4 | 89.5 | 89.8 | 90.0 | 0.99 | 1.01 |
| Particulate | 175 | 72.3 | 76.7 | 81.2 | 83.8 | 1.02 | 1.27 |
| Particulate | 200 | 74.7 | 78.5 | 78.6 | 84.8 | 1.02 | 1.28 |

*Measurement repeated

In reviewing the tabularized data it will be observed that maximum brightness (90.8), was obtained at doseage rates of 100 ml per 4 pounds of dry clay. Further it will be observed, that the best results obtained with the seeding particulate were as good as those yielded by flotation, superior by 2.4 units to the results yielded by prior art magnetic separation alone, and were inferior to flotation plus magnetic separation as practiced in the prior art.

It will also be noted that an increase in Fe$_2$O$_3$ content begins to occur for unleached samples (and a corresponding decrease in product brightness) as the doseage rate begins to exceed about 100 ml. This is indicative of the fact that above these levels a significant amount of the seeding particulate plus the contaminants are passing uncollected through the separating apparatus. In essence there is a level of addition at which the particulates overloads the capability of the separating apparatus.

EXAMPLE IX

Samples of kaolin clay of the "Clay B" type, were subjected to substantially the same treatment conditions as have been described for the preceding Example VIII. The results yielded for this type of clay are set forth in Table VIII below:

Table VIII

| Method | Aqueous Mag.Part. (ml/4# clay) | Product Brightness | Leached Brightness | | | TiO$_2$ % | Fe$_2$O$_3$ % |
|---|---|---|---|---|---|---|---|
| | | | 4#/ton | 6#/ton | 8#/ton | | |
| Float alone | — | 88.0 | 90.7 | 91.0 | 91.2 | 0.42 | 0.24 |
| Float + Magnet | — | 89.8 | 90.6 | 91.0 | 91.7 | 0.42 | 0.18 |
| Blunger alone | — | 77.9 | 84.0 | 84.1 | 84.1 | 1.63 | 0.24 |
| Magnet alone | — | 84.3 | 87.8 | 87.9 | 87.9 | 0.99 | 0.18 |
| Magnet + Magnetic Particulate | 25 | 90.1 | 91.7 | 91.9 | 92.0 | 0.99 | 0.23 |
| Particulate | 50 | 90.5 | 92.3 | 92.3 | 92.3 | 0.31 | 0.23 |
| Particulate | 75 | 91.1 | 92.0 | 93.0 | 93.1 | 0.09 | 0.17 |
| Particulate | 100 | 89.0 | 92.0 | 92.6 | 92.6 | 0.05 | 0.23 |
| Particulate | 125 | 90.0 | 92.4 | 92.7 | 92.7 | 0.09 | 0.24 |
| Particulate | 150 | 87.4 | 92.5 | 92.7 | 92.7 | 0.16 | 0.28 |
| Particulate | 175 | 77.5 | 90.0 | 90.5 | 90.8 | 0.45 | 0.27 |
| Particulate | 200 | 80.1 | 91.7 | — | 91.7 | 0.61 | 0.33 |

The above tabularized data indicates that an optimum doseage rate for the simplified magnetic seeding particulate prepared as in Example II, is in the 75–100 ml range. Of particular significance is the fact that the best brightness obtained (93.1), is far superior to that yielded by any of the prior art techniques — including, in particular, magnetic separation alone, flotation alone, and the technique of magnetic separation plus flotation (which up until the present time has been the most advantageous method known in the prior art). It should also be noted in reviewing the tabularized data, that once again excessive doseage rates of the particulate begin to have a detrimental effect upon both TiO$_2$ and Fe$_2$O$_3$ content, while at the same time brightness levels decrease.

EXAMPLE X

As has previously been indicated, preferable particulates for use with the present invention are the simplified synthetic ferroso-ferric oxide particulates of the type prepared in Example II. In accordance with a further aspect of the present invention, however, it is found that finely ground natural magnetite, i.e. finely powdered ferroso-ferric oxide derived from ground magnetite, may be employed with the processes of the invention.

In the present Example, samples of powdered ferrosoferric oxide were utilized, which were commercially available products of Matheson, Coleman & Bell of Norwood, Ohio. The said material was a ground natural magnetite — i.e. not a synthetic. The particle size distribution for this product, as determined by Sedigraph analysis, indicated that 50% by weight of the particles were less than 30 micron E.S.D.

This powdered magnetite was utilized in the course of magnetically seeding kaolin clay slurries of the "Clay C" type, which were then subjected to magnetic separation, utilizing a pump setting of 10 (corresponding to 72/sec. retention time). Magnetic field intensities of 15 kilogauss were employed, and the separating apparatus was as otherwise set forth in connection with Example I herein. The matrix was again a steel wool, packed at 7.5%. The result of the foregoing operations are set forth in Table IX below — for several levels of magnetite addition (in #/ton); for several levels (lbs/ton) of leachant addition; and also for a control test wherein no magnetite was added.

Table IX

| Magnetite #/ton | Product Brightness | Leached Brightness 4#/ton | 6#/ton | 8#/ton |
|---|---|---|---|---|
| 0 | 88.8 | 90.4 | 90.4 | 90.4 |
| 5 | 89.4 | 91.0 | 91.1 | 91.1 |
| 10 | 89.3 | 91.1 | 91.1 | 91.1 |

The tabulated data is seen to be substantially identical for both the 5 and 10 pound/ton addition levels of magnetite. It will, of course, be clear that salutary effects indeed result in consequence of the magnetite addition. The leached brightnesses resulting are superior to those obtained by use of magnetic separation, and of a flotation process, taken individually. They are, however, inferior to brightness improvements gained by use of prior art flotation coupled with magnetic separation; and they are also inferior to the brightness improvements obtained by use of magnetic separation in the presence of the synthesized activators of Example II (see Table II).

It will further be noted that the "product" brightnesses of Table IX are in fact superior to the corresponding "product" brightness obtained utilizing either the aqueous particulates of Example II or the ferrofluids of Example V, each of which include the synthesized ferroso-ferric oxide. It is hypothesized that such result obtains because the coarser magnetite of the present Example, is more efficiently extracted from the clay slurry, than is the relatively much finer synthesized precipitate discussed in the prior Examples herein. It may further be noted in the same connection, that the relatively coarse dimensions of the natural magnetite particles utilized here, caused some practical problems, i.e. it proved to be somewhat difficult maintaining the coarse magnetite in suspension, prior to passing the treated slurry through the magnetic separating apparatus.

EXAMPLE XI

In the Examples thus far set forth, apparatus of the general type disclosed in Marston U.S. Pat. No. 3,627,678 has been utilized. In all instances of the prior Examples a field intensity of 15 kilogauss was employed, and the matrix for the said apparatus comprised a stainless steel wool which filled the canister of the apparatus at a 7.5% packing. By the latter term is meant, that although the steel wool extended to all parts of the canister, only 7.5% of the total canister volume was actually occupied by the matrix material.

While the invention is especially well suited for use with prior art collection matrices such as those formed of steel wool, other matrices as are known in the art may be employed, including those formed of wire, steel balls, steel rods, tacks, porous ferromagnetic foams or so forth. Similarly the invention may be practiced with numerous other prior art separator apparatus including e.g. the spaced plate type of separators shown, e.g. in numerous of the patents to G. H. Jones, such as U.S. Pat. No. 2,834,470.

In the present Example, the invention was practiced with a Marston-type of separator — but utilizing other types of matrices. In addition, the magnetic separator was in a number of instances operated with a magnetic field intensity of 5 kilogauss.

Specifically, matrices of the following types were utilized: (a) no matrix; (b) 7.5% packed steel wool, extended throughout the entire canister; (c) steel wool, positioned only at the outflow portions of the generally cylindrical canister; (d) 1 inch carpet tacks packed throughout the canister; and (e) steel balls having an average diameter of about 0.17 inch packed throughout the canister.

In the instance of procedure (c), the overall axial length of the separator canister was 22 inches, and its diameter approximately 1½ inches. The said steel wool was positioned at the last 6 inch axial length thereof. The objective of such procedure was to encourage a degree of magnetic flocculation to occur, i.e. in consequence of the magnetic field, well prior to the seeded slurry impinging at the matrix.

Utilizing the varying configurations above mentioned, a series of kaolin clay samples of the "Clay D" type were seeded with 100 ml per 4# clay, utilizing the magnetic particulate of Example II. One group of the seeded samples were subjected to magnetic separation using a 5 kilogauss field; and a second group of seeded samples were subjected to separation by a 15 kilogauss field. The ensuing results are set forth in Table X hereinbelow:

Table X

| | Magnetic Field = 5 KG | | | | Magnetic Field = 15 KG | | | |
| | Brightness | | $TiO_2$ | $Fe_2O_3$ | Brightness | | $TiO_2$ | $Fe_2O_3$ |
| Matrix | Product | Leached(8#/ton) | (%) | (%) | Product | Leached(8#/ton) | (%) | (%) |
|---|---|---|---|---|---|---|---|---|
| None | 70.0 | 83.2 | 1.48 | 1.11 | 73.7 | 86.7 | 1.48 | 1.20 |
| Steel Wool | 88.2 | 91.7 | 0.19 | 1.01 | 90.0 | 92.2 | 0.19 | 0.95 |
| 6" Steel Wool | 82.8 | 89.9 | 0.73 | 1.09 | 83.2 | 90.6 | 0.51 | 0.98 |
| Tacks | 79.7 | 88.7 | 1.15 | 1.21 | 83.0 | 89.5 | 1.05 | 1.21 |
| Steel Balls | 85.7 | 89.5 | 0.70 | 1.09 | 85.9 | 89.8 | 0.66 | 0.17 |

In a second series of tests kaolin clay samples of the "Clay B" type were seeded with 75 ml per 4# dry clay with the same simple magnetic seeding particulate of Example II. Similar set of tests were run, as has been described in connection with Table XI, with the resultant data being tabulated in Table XI below:

Table XI

| Matrix | Magnetic Field = 5 KG | | | | Magnetic Field = 15 KG | | | |
| --- | --- | --- | --- | --- | --- | --- | --- | --- |
| | Brightness | | $TiO_2$ | $Fe_2O_3$ | Brightness | | $TiO_2$ | $Fe_2O_3$ |
| | Product | Leached(8#/ton) | (%) | (%) | Product | Leached(8#/ton) | (%) | (%) |
| None | 71.0 | 82.0 | 1.56 | 0.27 | 72.9 | 84.9 | 1.56 | 0.18 |
| Steel Wool | 87.4 | 92.3 | 0.22 | 0.18 | 87.4 | 92.3 | 0.16 | 0.20 |
| 6" Steel Wool | 87.9 | 92.1 | 0.32 | 0.21 | 88.2 | 92.3 | 0.19 | 0.20 |
| Tacks | 82.7 | 89.4 | 0.58 | 0.27 | 84.2 | 90.4 | 0.48 | 0.24 |
| Steel Balls | 87.9 | 88.5 | 0.3 | 0.24 | 88.0 | 89.0 | 0.26 | 0.24 |
| Steel Balls* | 84.0 | 86.0 | 1.56 | 0.24 | 84.3 | 86.6 | 1.44 | 0.24 |

*no particulate(control)

In all instances for the tabulated data of Tables X and XI, cross-reference may be had to Table I herein — setting forth control data. First, it will be evident that the matrices in order of efficiency are as follows: Steel wool; 6 inch steel wool; steel balls; carpet tacks; no matrix.

Of particular significance is the fact that with steel wool matrices and in the presence of the magnetic particulates of the invention, brightness improvements are obtained at 5 kilogauss field intensity, which are superior to the results yielded for prior art magnetic separation at 15 kilogauss. Indeed for the "Clay B" samples of Table XI, the brightness improvements that are yielded with steel wool matrices in the presence of the magnetic particulates, are superior at 5 kilogauss field intensity to the improvements in brightness yielded by flotation plus magnetic separation at 15 kilogauss without the said particulates.

Of further significance, it will be observed that both the carper tacks and steel ball matrices in the presence of the low 5 kilogauss field, yield brightness improvements for the "Clay B" sample, which are superior to the brightness improvements gained by using steel wool matrices without the particulates of the invention at 15 kilogauss.

It will further be noted that at 15 kilogauss field intensity, the effect of the particulate additions is to yield brightness improvements which are superior to those provided by prior art flotation plus magnetic separation — for both of the clay types which are exemplified in Tables X and XI.

It should, of course, be appreciated in connection with the foregoing, that employment of a magnetic field of relatively reduced intensity (i.e. as compared to the high intensity treatments propounded in the prior art) has enormous consequence for the present art. Among these are a vast reduction in the capital outlays which have in the past been required for apparatus capable of producing high intensity field. Thus, e.g. the relatively enormous cost of high current capacity coils may be obviated where lower field intensities are utilized. Similarly, operating costs are greatly reduced — a factor which is of ever-increasing significance in view of precipitously escalating costs of electrical power. In a similar vein it will be evident that maintenance costs for apparatus designed to operate at relatively low field intensities, are much reduced in comparison to the maintenance cost associated with high intensity separators.

EXAMPLE XIII

In this Example four different methods were utilized in synthesizing ferroso-ferric oxide particulates for use in the invention: (a) The procedure set forth in Example II was utilized; (b) The procedure of Example II was followed, except that the solution of iron salts was heated and placed in a Waring blender. The ammonium hydroxide solution was then added instantaneously, yielding a viscous black liquid which did not separate as readily as that prepared by method (a); (c) The composition obtained by method (b) was filtered, and then washed with copious quantities of deionized water. Finally it was washed with 0.01 normal HCl. The dry sediment was dispersed in boiling water; (d) The sediment of ferroso-ferric oxide obtained by using method (c) was dispersed in a boiling solution of 0.5% soap.

The objective of using varying techniques for synthesizing the particulates was principally one of introducing additional conditions favoring the production of a large number of nuclei, in that large numbers of nuclei are (in general) advantageous for use in the invention. Method (a), to some extent, favors the production of high number of nuclei — by use of high concentration of reagents, and by vigorous agitation. On the other hand, additional factors favoring production of large number of nuclei are not present in method (a), including the use of high temperatures and of rapid addition of one reagent to the other.

The magnetic seeding materials prepared by methods (a), (b), (c) and (d) were thereupon utilized in the course of treating kaolin clay samples. In each instance the doseage rate was equalized, so that each 4# clay sample contained 3.72g of ferroso-ferric oxide, i.e. the equivalent of 75 ml of the aqueous compositions of Example II. As a control experiment, the clay samples were also dosed with a similar quantity of powdered magnetite of the type set forth in Example X. The separating apparatus was of the same type utilized in previous Examples, with a field of 15 kilogauss being employed; a matrix of 7.5% steel wool, and a pump setting of 10. The resultant data is set forth in Table XII for two different sets of clay samples, i.e. "Clay B" and "Clay D".

Table XII

| Clay | Preparation Method | Product Brightness | Leached Brightness | | | $TiO_2$ (%) | $Fe_2O_3$ (%) |
| --- | --- | --- | --- | --- | --- | --- | --- |
| | | | 4#/ton | 6#/ton | 8#/ton | | |
| Clay B | (a) | 91.1 | 92.0 | 93.1 | 93.1 | 0.09 | 0.17 |
| | (b) | 84.0 | 90.1 | 90.2 | 90.2 | 0.43 | 0.26 |
| | (c) | 88.2 | 90.0 | 90.0 | 90.0 | 0.88 | 0.13 |
| | (d) | 88.2 | 89.5 | 89.5 | 89.5 | 0.87 | 0.13 |
| | Magnetite | 88.1 | 90.2 | 90.2 | 90.2 | 0.92 | 0.23 |
| Clay B | (a) | 87.5 | 89.9 | 90.0 | 90.0 | 0.81 | 0.89 |
| | (b) | 87.5 | 91.2 | 91.2 | 91.2 | 0.87 | 1.03 |
| | (c) | 89.5 | 91.0 | 91.0 | 91.0 | 0.87 | 0.84 |
| | (d) | 89.6 | 90.7 | 90.7 | 90.7 | 0.94 | 0.78 |
| | Magnetite | 89.4 | 91.1 | 91.1 | 91.1 | 0.90 | 0.83 |

Consideration of Table XII indicates that, in general, each of the methods (a) through (d) yield effective results with the invention. In the case of the "Clay B" samples, the most effective results were yielded by method (a). In the instance of the "Clay D" samples, methods (b), (c), and (d), and even seeding with magnetite, yield results markedly superior to those obtained even by use of prior art flotation plus by magnetic separation.

Particle size has a critical effect on the particle density per unit volume of the seeded slurry, in that particle density is a cubic function of particle sizes. If the particle size is indeed finer when prepared by method (b) than when prepared by method (a), two countervailing factors are at work. In particular the smaller particles are not captured as readily by the separator matrix; conversely there are many more particles present to seed the clay slurry, and thus improve extraction. The differential between leached and product brightness in methods (b), (c) and (d) suggest that an excess of iron passes through the magnetic separator, indicating that lowered doseage rates of the finer precipitates would be advantageous. This will become further evident in connection with Example XIV.

EXAMPLE XIV

In this Example the magnetic seeding particulate was prepared as in Example II, with the important exception that the ammonium hydroxide was added rapidly to the heated iron salt solution, thereby encouraging (as previously mentioned) the production of large numbers of small nuclei. Samples of "Clay D" and of "Clay B" kaolins were seeded with the resultant particulate and were subjected to magnetic separation in apparatus and under conditions as previously set forth. The field intensity in all instances was 15 kilogauss, and a pump setting of 10 (72 sec. retention time) was utilized. Doseage rate was varied and the steel wool matrix was 7.5% packed. The brightness data obtained in consequence, is set forth in Table XIII for the "Clay D" samples, and in Table XIV for the "Clay B" samples.

Table XIII

| Dose Rate ml./4 lb. | Product Brightness | Leached Brightness 4#/ton | 6#/ton | 8#/ton | $TiO_2$ (%) | $Fe_2O_3$ (%) |
|---|---|---|---|---|---|---|
| 15 | 89.8 | 91.0 | 91.2 | 91.2 | 0.32 | 1.03 |
| 25 | 91.1 | — | — | 92.2 | 0.19 | 0.88 |
| 50 | 87.7 | — | — | 90.9 | 0.19 | 0.97 |
| 75 | 87.5 | 91.2 | 91.2 | 91.2 | 0.87 | 1.03 |

Table XIV

| Dose Rate ml./4 lb. | Product Brightness | Leached Brightness 4#/ton | 6#/ton | 8#/ton | $TiO_2$ (%) | $Fe_2O_3$ (%) |
|---|---|---|---|---|---|---|
| 15 | 88.9 | 90.4 | 90.6 | 90.6 | 0.87 | 0.27 |
| 25 | 90.9 | 92.0 | 92.0 | 92.7 | 0.05 | 0.21 |
| 50 | 90.8 | 90.8 | 91.9 | 92.3 | 0.26 | 0.20 |
| 75 | 84.0 | 90.1 | 90.2 | 90.2 | 0.43 | 0.26 |

At doseage rate levels of 25 ml per 4# dry clay, the results achieved with the seeding particulate used in this Example are markedly superior to results yielded by flotation plus conventional magnetic separation. It will further be noted that the results for "Clay B" samples (best brightness 92.2) are better than where the synthesized particulates are prepared via slow addition of ammonium hydroxide. Of additional significance, however, is the fact that the optimum doseage rate with the seeding materials prepared in accordance with the procedure of the present Example is only one-third of the optimum doseage rates indicated where the particulates are prepared by the methods of Example II. The explanation is believed to be that the much larger number of nuclei produced by the method of this Example, enables (or "requires") use of much lower doseage levels in order to achieve optimal results. Where the doseage levels of the present type of particulates are raised too high, overloading of the separating apparatus will occur. It will, of course, be evident that a particular advantage of using the much smaller doseage levels is a comparatively great saving in the cost of materials.

EXAMPLE XV

The present Example illustrates further, the manner in which practice of the present invention enables use of vastly reduced field intensities in the course of brightening mineral slurries. In particular, a magnetic seeding particulate prepared as in Example XIV, was utilized herein for seeding kaolin clay slurry samples of the "Clay D" and of the "Clay B" types. The seeded slurries were thereupon passed through magnetic separating apparatus of the type discussed in connection with Example II. A matrix of 7.5% packed steel wool was employed. The pump setting was 10 (corresponding to 72 sec. retention time); and a field intensity of only 7 kilogauss was utilized. The doseage rate of the seeding particulate was varied. Brightness data obtained in consequence, is set forth in Table XV below:

Table XV

| Clay | Dose Rate ml./4 lb. | Brightness Product | Leached (8#/ton) | $TiO_2$ (%) | $Fe_2O_3$ (%) |
|---|---|---|---|---|---|
| Clay D | 20 | 89.8 | 91.8 | 0.48 | 1.02 |
| | 30 | 89.8 | 92.2 | 0.22 | 0.97 |
| | 40 | 89.7 | 92.3 | 0.22 | 0.97 |
| Clay B | 20 | 88.8 | 90.5 | 0.70 | 0.21 |
| | 30 | 88.9 | 91.5 | 0.51 | 0.20 |
| | 40 | 88.4 | 92.5 | 0.31 | 0.20 |

The extremely unexpected results set forth in the Table, indicate brightness gains with a field strength of but 7 kilogauss and doseage rates of between 20 and 40 ml per 4# dry clay, which are markedly superior to the results obtained using prior art flotation plus magnetic separation at high field strengths, i.e. at 15 kilogauss. See in this connection the corresponding control data of Table I herein. Similarly the reduction in $TiO_2$ and $Fe_2O_3$ content, is comparable to the results achieved by the cited prior art combined technique.

EXAMPLE XVI

In the present Example, the powdered natural magnetite described in Example X was utilized for seeding kaolin clay slurries of the type used in Example XIV. The seeded slurries were then subjected to low intensity magnetic separation, again as in Example XIV. The results of these operations are set forth in Table XVI hereinbelow:

Table XVI

| Clay | Dose Rate lb/ton | Brightness Product | Leached (8#/ton) | $TiO_2$ (%) | $Fe_2O_3$ (%) |
|---|---|---|---|---|---|
| Clay D | 2 | 88.6 | 90.4 | 0.87 | 0.97 |
| | 4 | 88.8 | 90.7 | 0.87 | 1.02 |
| | 6 | 88.7 | 90.4 | 0.93 | 0.99 |
| Clay B | 2 | 87.5 | 89.8 | 1.02 | 0.24 |
| | 4 | 86.9 | 89.5 | 1.02 | 0.26 |
| | 6 | 87.0 | 89.5 | 0.99 | 0.20 |

Consideration of the above tabularized data, will establish that the brightening improvements achieved, are generally inferior to those obtained by use of the preferred, synthetized ferroso-ferric oxide particulates, e.g. as in Example XV. However, the results achieved, for example with the "Clay B" samples, while inferior to those enabled by conventional flotation, are superior to brightening effected by conventional magnetic separation at 15 kilogauss. Further, in the instance of the "Clay D" samples, the brightening results achieved are superior to those effected through use of conventional magnetic separation at 15 kilogauss, or of conventional flotation, or via conventional flotation plus magnetic separation at 15 kilogauss.

It will be evident, particularly from consideration of Examples XIV and XV, and by comparison of the data tabulated in these Examples with the data of Table II herein (Example III), that the concentration of synthesized ferroso-ferric oxide particulate yielding maximum efficacy in a given separation, is in part a function of the mode of synthesis of the particulate. In general, however, a useful concentration range for the synthesized aqueous ferroso-ferric oxide particulate, is from approximately 10 to 150 ml/4 lb. of dry clay, where each said mililiter includes about 0.05g equivalent of $Fe_3O_4$. This, it may be noted, corresponds to a range of approximately ½ to 7 lbs. per ton dry clay of $Fe_3O_4$, in that, as previously mentioned, each 100 ml of the aforementioned aqueous particulate contains approximately 5 grams. equivalent of $Fe_3O_4$.

EXAMPLE XVII

In this Example aqueous particulates of additional ferrimagnetic materials were utilized as seeding particulates in the present invention. In particular Nickel and Cobalt Ferrities were prepared using the procedure described in "Preparation, Growth, & Study of Ultrafine Ferrite Particles" (Schuelle, W. J. and Deetscreek, V. D., J. Appl. Phys. 32 Suppl, No. 3, 235S, [1961]). This is similar to the Elmore method previously referenced, for producing ferroso-ferric oxide. Nickel (or Cobalt) Chloride was thus mixed with the ferric chloride in the molar ratio of 1:1.8 (as for ferroso-ferric oxide) and $NH_4OH$ added to the mixture rapidly.

The magnetic seeding particulates thus prepared were then utilized for seeding kaolin clay slurry samples of the Clay B type. The seeded slurries were thereupon passed through magnetic separating apparatus of the type discussed in connection with Example II. A matrix of 7.5% packed steel wool was employed. The pump setting was 10 (corresponding to 72 sec. retention time); and a field intensity of 15 kilogauss was utilized. The doseage rate of the seeding particulate was varied. Brightness data obtained in consequence is set forth in Table XVII below:

Table XVII

| Magnetic Seeding Particulate | Concentration (ml/4 lb. clay) | Brightness Product | Brightness Leached (8#/ton) | $TiO_2$ (%) | $Fe_2O_3$ (%) |
| --- | --- | --- | --- | --- | --- |
| $NiFe_2O_4$ | 25 | 86.8 | 89.6 | 0.93 | 0.13 |
| $NiFe_2O_4$ | 40 | 88.4 | 90.7 | 0.81 | 0.11 |
| $CoFe_2O_4$ | 25 | 87.5 | 90.0 | 0.78 | 0.16 |
| $CoFe_2O_4$ | 40 | 88.2 | 90.6 | 0.81 | 0.16 |

As may be ascertained from the control data of Table I, these results are inferior to those yielded by prior art flotation coupled with magnetic separation. They are, however, in all instances, superior to prior art magnetic separation, conducted under similar conditions — but without use of the seeding methods of the present invention.

While the present invention has been particularly set forth in terms of specific embodiments thereof, it will be understood in view of the instant disclosure, that numerous variations upon the invention yet reside within the scope of the present teaching. Accordingly the invention is to be broadly construed, and limited only by the scope and spirit of the claims now appended hereto.

We claim:

1. A method for magnetically separating discoloring titaniferous contaminants of low magnetic attractability from a crude kaolin clay, comprising the steps of:
   forming a dispersed aqueous slurry of said clay;
   seeding said slurry with a particulate comprising an aqueous unpeptized suspension of a precipitate of ferrosoferric oxide, the particles of which are of predominantly colloidal size, said precipitate being the product of aqueous coprecipitation of iron (III) with iron (II) salts in the presence of an excess of a strong base; and
   subjecting the seeded slurry to a magnetic separation by passing said slurry through a porous ferromagnetic matrix positioned in a magnetic field to remove at least part of said particulate together with said titaniferous contaminants flocculated therewith.

2. A method in accordance with claim 1, further including leaching the purified product separated from said contaminants by said magnetic separation, to remove leachable iron, including at least part of the remnants of said seeding particulate.

3. A method in accordance with claim 1, wherein said aqueous precipitate is added to said slurry in concentrations of from about 10 to 150 ml per 4 lb. of dry clay, where each said ml includes about 0.05g equivalent of $Fe_3O_4$.

4. A method in accordance with claim 1, wherein said precipitate is added in concentrations including from about ½ to 7 lb. equivalent of $Fe_3O_4$ per ton of dry clay.

5. A method in accordance with claim 1, wherein at least 50% of said particles by weight are of less than 1 micron E.S.D.

6. A method in accordance with claim 1, wherein said ferroso-ferric oxide has an iron (III) to iron (II) ratio of from about 1 to 2.5.

7. A method in accordance with claim 6, wherein said ratio is in the range of from about 1.5 to 2.0.

8. A method in accordance with claim 1, wherein said magnetic field has an average intensity as low as 5 kilogauss.

9. A method in accordance with claim 8, wherein said matrix comprises steel wool.

10. A method in accordance with claim 9, wherein said magnetic field has an average intensity of from about 15 to 22 kilogauss.

11. A method in accordance with claim 10, wherein the retention time of said slurry in said magnetic field is at least 15 seconds.

12. A method in accordance with claim 8, wherein said matrix comprises steel balls.

13. A method in accordance with claim 8, wherein said matrix comprises steel tacks.

14. A method in accordance with claim 8, wherein said magnetic field has an average intensity of from about 5 to 15 kilogauss.

15. A method for magnetically separating discoloring titaniferous contaminants of low magnetic attractability from a crude kaolin clay, comprising the steps of:
   preparing an aqueous particulate of ferroso-ferric oxide by coprecipitating iron (III) with iron (II)

salts, with an excess of a strong base to yield an unpeptized suspension of particles of predominantly colloidal size in an aqueous carrier;

forming a dispersed aqueous slurry of said clay;

seeding said slurry with said particulate; and subjecting said seeded slurry to a magnetic separation by passing said slurry through a porous ferromagnetic matrix positioned in a magnetic field to magnetically separate at least part of said particulate together with said titaniferous contaminants flocculated therewith.

16. A method in accordance with claim 15, wherein said ferrosoferric oxide has an iron (III) to iron (II) ratio of from about 1 to 2.5.

17. A method in accordance with claim 16, wherein said ratio is in the range of from about 1.5 to 2.0.

18. A method in accordance with claim 15, further including leaching the purified product separated from said contaminants by said step of magnetic separation, to remove iron, including at least part of the remnants of said seeding particulate.

19. A method in accordance with claim 15, wherein said particulate is prepared by heating an aqueous solution of said iron salts, and rapidly adding said base thereto, to promote production in said particulate of large numbers of minute seeding nuclei.

20. A method in accordance with claim 19, wherein said base comprises ammonium hydroxide.

21. A method in accordance with claim 19, wherein said aqueous particulate is added to said slurry in concentrations of from about 10 to 75 ml per 4 lb. dry clay, where each said ml includes about 0.5g equivalent of $Fe_3O_4$.

22. A method in accordance with claim 21, wherein said aqueous particulate is added in concentrations of from about 20 to 40 ml per 4 lb. of dry clay.

23. A method in accordance with claim 15, wherein said matrix comprises steel wool, and wherein said field is as low as 5 kilogauss in average intensity.

24. A method in accordance with claim 23, wherein said field has an average intensity of from about 5 to 15 kilogauss.

* * * * *